United States Patent [19]
Hosoe

[11] Patent Number: 5,305,089
[45] Date of Patent: Apr. 19, 1994

[54] LASER INTERFEROMETER INCLUDING AN OPTICAL UNIT HAVING A CORNER CUBE PRISM, A PARALLELOGRAM PRISM, A TRIANGLE PRISM, AND A POLARIZING PLATE INTERGRATED TO FORM ONE BODY

[75] Inventor: Shigeru Hosoe, Sagamihara, Japan
[73] Assignee: Konica Corporation, Tokyo, Japan
[21] Appl. No.: 848,061
[22] Filed: Mar. 9, 1992

[30] Foreign Application Priority Data

Mar. 11, 1991 [JP] Japan ................... 3-044890

[51] Int. Cl.⁵ ............................... G01B 9/02
[52] U.S. Cl. .................... 356/356; 356/351; 356/358
[58] Field of Search ............ 356/349, 351, 358, 357

[56] References Cited

U.S. PATENT DOCUMENTS 4,802,764  2/1989  Young et al. .................. 356/349
5,172,186  12/1992  Hosoe ........................... 356/351

Primary Examiner—Samuel A. Turner
Assistant Examiner—Robert Kim
Attorney, Agent, or Firm—Finnegan, Henderson, Farabow, Garrett & Dunner

[57] ABSTRACT

The invention provides a laser interterometric measuring apparatus for measuring the position of an object. A corner cube prism receives a laser beam from a emitting device, splits the beams into a reference beam and a measuring beam, and let the beams to proceed to a fixed mirror and a movable mirror. The corner cube prism has a coated surface to selectively reflect or pass a beam therethrough in accordance with the polarization condition of the beam. On the coated surface of the corner cube prism are provided a parallelogram prism, a triangle prism disposed next to the parallelogram prism on the coated surface, and a polarizing plate disposed between the parallelogram prism and the triangle prism.

12 Claims, 4 Drawing Sheets

LASER INTERFEROMETER INCLUDING AN OPTICAL UNIT HAVING A CORNER CUBE PRISM, A PARALLELOGRAM PRISM, A TRIANGLE PRISM, AND A POLARIZING PLATE INTERGRATED TO FORM ONE BODY

BACKGROUND OF THE INVENTION

The present invention relates to a differential type interference prism (referred to as an interference prism, hereinafter) for use in a differential type laser interference length measuring instrument.

In a differential type laser interference length measuring instrument, a laser beam is branched into reference light flux and measuring light flux, which are respectively introduced to a reference mirror by which the reference light flux is returned, and to a measuring mirror by which the measuring light flux is returned, which are located in the same direction, and then an interference fringe detection signal is obtained from the light flux for optical path difference information using both light flux by a heterodyne method or an interference fringe counting method so that the length can be measured. In order to enhance the stability of the detection signal, it is required that the reference light flux and the measuring flux have optical paths which are as close to each other as possible so that the light path difference between two light paths is not badly influenced by expansion and contraction of an optical element caused by a temperature variation, fluctuation of the atmosphere, or an atmospheric pressure variation. That is, it is preferable that the reference light flux and the measuring light flux are always coaxial because they are influenced in common by the factors described above so that the influence on the optical path difference can be cancelled. However, it is difficult to separate the reference light flux from the measuring light flux. Therefore, in general, the reference light flux and the measuring light flux are separated by more than 10 mm. Consequently, in the differential type laser interference length measuring instrument, the reference light flux has a different optical path from the measuring light flux, resulting in considerable influence on the optical paths of both light flux by the aforementioned disturbance factors. This causes a problem of instability (drift, noise) in the detection signal when length measurement resolving power smaller than one nanometer has to be obtained.

FIG. 4 and FIG. 5 show respectively optical path arrangements of conventional differential type laser interference length measuring instruments. In the drawings, L is laser light flux, R is the reference light flux, M is the measuring light flux, I is the optical path difference information light flux in which the reference light flux and the measuring light flux are coaxial, and from which the interference fringe detection signal can be obtained by a conventionally known heterodyne method or an interference fringe counting method, 1 is a polarized light beam splitter, 11 is a polarized light shearing plate, 2 is a λ/2 phase shifting plate, 3 is a λ/4 phase shifting plate, 4 is a corner cube prism, 5 is a reflection mirror, 6 is a reference mirror, 7 is a measuring mirror, and 74 is a corner cube prism which has the same function as the measuring mirror. As shown in FIG. 4 and FIG. 5, the conventional differential type length measuring instrument has many redundant structures of the optical path using cube prisms in order to obtain an optical path arrangement of the differential type, and therefore, the optical path length of branched reference light flux R and measuring light flux M extends to more than 200 mm, and the optical path length in optical elements becomes more than 80% in an interference prism. Therefore, there is a problem in which the optical path difference between the optical path of reference light flux R and that of measuring light flux M is considerably varied by the influence of disturbances generated transiently in the optical path, such as imbalance of a density or a dimension of the optical element caused by a temperature variation, so that it is difficult to measure a length having an accuracy higher than a nanometer.

SUMMARY OF THE INVENTION

The present invention is made to solve the above-described problems, and to provide an interference prism which is used for a laser interference length measuring instrument which can stably measure a length with sub-nanometer accuracy by utilizing the merit of a differential type of interference prism.

The above-described object is accomplished by an instrument having a differential type interference prism which is characterized in that: a polarized light beam splitting coating is provided on a reflection surface of a corner cube prism; and a parallelogram prism and a triangle prism which are connected by sandwiching a λ/2 phase shift plate or a 90° rotatory polarization plate on the surface provided with the coating, are connected in a way in which the triangle prism is located at the central side of the corner cube prism.

That is, in the interference prism of the present invention, when a laser beam enters from the outward facing surface which intersects a connected surface on which the parallelogram prism is connected with the corner cube prism, the laser beam is branched into a reference light flux and a measuring light flux on the connected surface of the parallelogram prism with the surface having the polarized beam splitting coating on the corner cube prism, and both the reference and the measuring light flux make two round trips, that is, one travels between a penetrated surface of the corner cube prism and a reference mirror having a λ/4 phase shifting plate provided between the prism and the mirror, and the other travels between the penetrated surface and a length measuring mirror. Then, both the reference and the measuring light flux are combined into one on the connected surface of the triangle prism with the surface having the polarized beam splitting coating on the corner cube prism, and the flux is used as optical path information light flux which has the information of the optical path difference between the reference mirror and the measuring mirror, and is sent from the outward facing surface of the triangle prism. In the optical elements, the optical path of the reference light flux is apart from that of the measuring light flux only in a corner cube prism, therefore, the optical path length in the above case is short, and the distance between the two optical paths can be relatively easily shortened, so that the influence on the optical path difference between both the reference and the measuring light flux caused by disturbances such as temperature variations or the like can be reduced, and the length can be measured stably with subnanometer accuracy.

DETAILED DESCRIPTION OF THE PREFERRED EMBODIMENT

Figure 1:
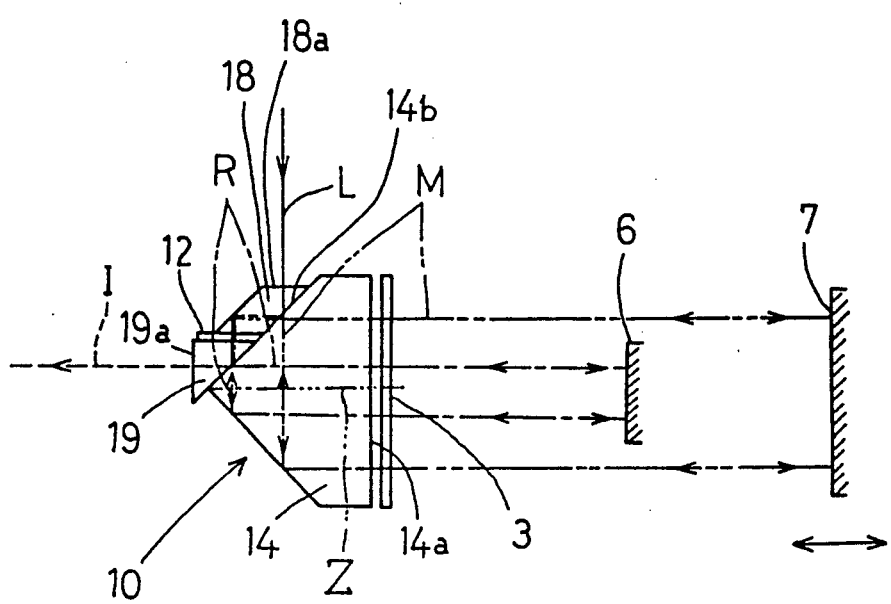
FIGS. 1 and 2 are views showing an optical path arrangement of a laser interference length measuring instrument using an interference prism of the present invention.
Figure 2:
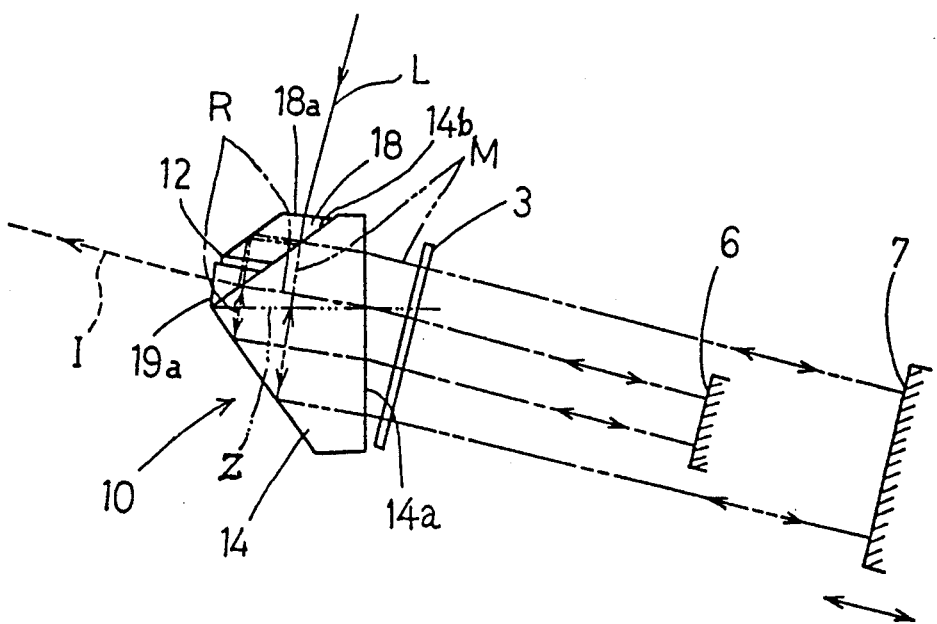

Referring to FIGS. 1 and 2, examples respectively shown in the drawings will be explained as follows.

FIGS. 1 and 2 show an optical path arrangement of a laser interference length measuring instrument using an interference prism of the present invention.

In FIG. 1, in a corner cube prism 14 for use in an interference prism 10 of the present invention, center axis Z of three reflection surfaces in an interference prism 10 is not perpendicular to a transmission surface 14a, that is, it is inclined from the perpendicular by an angle of $\cos^{-1}(1/\sqrt{3})-45°$, and a coated surface 14b of the reflection surface on which a polarized beam splitting coat is provided is placed at an angle of 45° to the transmission surface 14a. The polarized beam splitting coat makes an incident light on the coated surface reflect or transmit selectively depending on its polarized condition.

On the coated surface 14b, a parallelogram prism 18 is connected in a way that: four surfaces of the parallelogram prism are used as optical surfaces; two opposite angles are 45°; one of surfaces which sandwich a vertical angle of 45° is used as a connected surface; and another surface is an outward facing surface 18a which is used as an incident surface of laser beam optical flux L which is perpendicular to the transmission surface 14a of the corner cube prism 14 or an emergent surface of optical path difference information light beam flux I. Further, a right angled isosceles triangle prism 19 is connected onto a coated surface 14b of the corner cube prism 14 in a way that: a λ/2 phase shift plate or a 90° rotatory polarization plate (hereinafter, referred to as a light change plate) 12 are sandwiched between one of the orthogonal surfaces, by which a 90° vertical angle is sandwiched, and a parallel surface with the outward facing surface 18a of the parallelogram prism 18; and an inclined surface of the isosceles triangle prism 19 is connected with the coated surface 14b of the corner cube prism 14. In the triangle prism 19, the other outward facing surface 19a of the orthogonal surfaces, by which a 90° vertical angle is sandwiched, is an emergent surface of optical path difference information light or an incident surface of laser light flux L.

Figure 4:
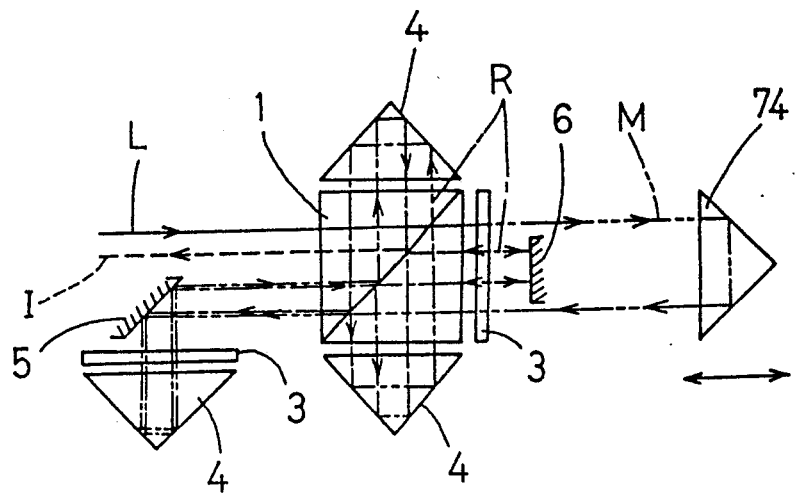
FIGS. 4 and 5 are views showing an optical path arrangement of a conventional differential type laser interference length measuring instrument.
Figure 5:
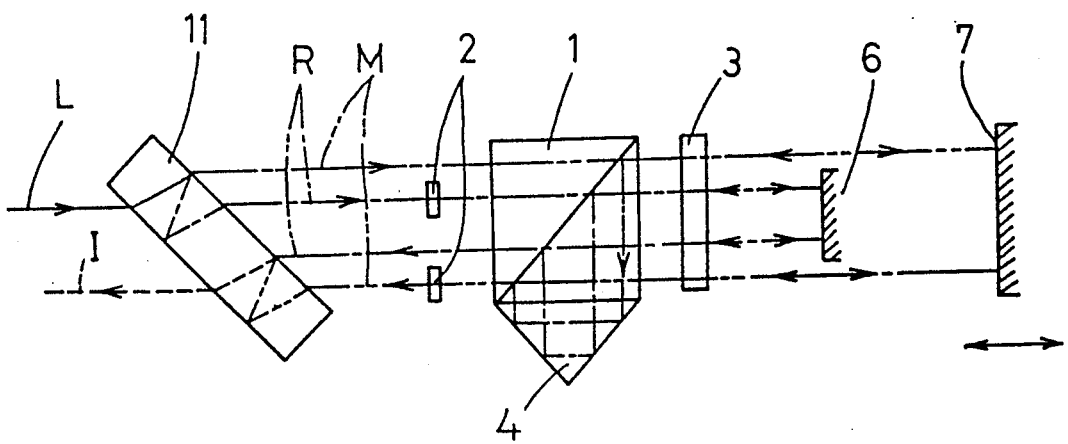

The interference prism 10 structured as described above, and a λ/4 phase shifting plate 3, a reference mirror 6 and a measuring mirror 7 are provided at the transmission surface 14a side of the corner cube prism 14, which is the same as in the case of the emergent surface side of the polarized beam splitter 1 in the optical arrangement in FIGS. 4 and 5. The λ/4 phase shifting plate 3 may be either connected with the transmission surface 14a of the corner cube prism 14, or not. It is better to connect the plate 3 on the surface 14a in order to reduce stray light on the interfacial surface by air, but, on the other hand, it is advantageous to separate the plate 3 from the surface 14a in order not to distort the wave surface of a transmission light flux.

Laser light flux L which enters the interference prism 10 may be either linearly polarized light of two wavelengths which are crossed at right angles in a heterodyne method, or a circularly polarized light of a single wavelength in an interference fringe counting method. The same result may be obtained either when the laser light enters from the parallelogram prism 18, or when it enters from the triangle prism 19.

Laser light flux L which enters the interference prism from the outward facing surface 18a of the parallelogram prism 18 is branched into linearly polarized light in a perpendicular direction to the incident surface and that in a parallel direction with the incident surface by the coated surface 14b of the corner cube prism 14. Although either light may be defined as reference light R or measuring light M, linearly polarized light which is reflected on the coated surface 14b in FIG. 1 and perpendicular to the surface of the drawing, FIG. 1, is defined as reference light flux R, and linearly polarized light which transmits the coated surface 14b and is in parallel with the surface of the drawing, is defined as measuring light flux M.

Reference light flux R is reflected on the coated surface 14b, and after that, it is reflected on the surface which is in parallel with the contacted surface of the parallelogram prism 18 with the corner cube prism 14, and after its polarization direction is converted by 90° by a light change plate 12, it becomes a linearly polarized light in parallel with the surface of the drawing, and enters the triangle prism 19. Then, it enters again the coated surface 14b of the corner cube prism 14, and, in its turn, passes through the coated surface 14b to enter the corner cube prism 14. Thus, the condition of polarized light of the reference light flux R is the same as that of the measuring light flux M.

Reference light flux R and measuring light flux M are respectively reflected on the reflection surface of the corner cube prism 14 to be sent from the transmission surface 14a, converted into circularly polarized light by the λ/4 phase shifting plate 3, returned respectively to the surfaces of the reference mirror 6 and the measuring mirror 7, and then converted into linearly polarized light perpendicular to the surface of the drawing by the λ/4 phase shifting plate 3 again to enter the corner cube prism 14 from the transmission surface 14a. The reference light flux R and the measuring light flux M are respectively returned in the corner cube prism 14 two or three times, sent again from the transmission surface 14a, and while they are returned respectively to the reference mirror 6 and the measuring mirror 7 and enter again the transmission surface 14a in the same manner as described above, they pass the λ/4 phase shifting plate 3 twice, so that measuring sensitivity is doubled by the optical path difference of the two round trips between the reference mirror 6 and the measuring mirror 7.

Reference light flux R and measuring light flux M which have entered again the corner cube prism 14 become linearly polarized light which is parallel with the surface of the drawing, and therefore, they penetrate respectively the coated surface 14b this time. Reference light flux R passes through the triangle prism 19 as it is, and is sent to the outside of the interference prism 10. Measuring light flux M is reflected in the parallelogram prism 18 once, passes through the light changing plate 12, and enters the connected surface of the triangle prism 19 with the coated surface 14b. Since measuring light flux M has the polarized light direction which is perpendicular to the surface of the drawing through the light changing plate 12, it is reflected on the coated surface 14b, and is coaxially superimposed onto reference light flux R which has transmitted through the coated surface 14b to become optical path difference information light flux I, and is sent from the interference prism.

Since the optical path difference information light flux I is composed of the light flux into which reference light flux R and measuring light flux M, which cross at right angles, are superimposed, displacement speed of the length measuring mirror 7 can be detected as a beat frequency change in a heterodyne method, and the displacement of the length measuring mirror 7 can be directly detected as a change of interference fringe conditions in an interference fringe counting method.

In the laser interference length measuring instrument, which is different from a conventional differential type length measuring instrument, a cube prism is not used at all except the corner cube prism 14 in the interference prism 10, resulting in a reduction of the optical path in the length measuring instrument. In the optical path in the parallelogram prism 18 and the triangle prism 19, since reference light flux R has the same axis as measuring light flux M, disturbance factors due to a change of circumstances or the optical influence on the length measuring signal due to non-uniformity of optical elements can be perfectly removed. That is, expansion, or influences due to an adhesive agent used for connection, due to temperature changes can be completely removed. Therefore, optical paths which are not coaxial, exist only in the corner cube prism 14 of the interference prism 10. When laser light flux L with the same beam diameter as that in a conventional length measuring instrument is used for the present invention, the optical path length is reduced to less than 1/6 of the conventional one, and instability in the length measuring instrument due to disturbance factors is significantly improved in proportion to the reduction of the optical path length. Furthermore, the number of optical elements is reduced by three elements compared with the conventional one in FIG. 4, and by two elements in the conventional one in FIG. 5, which reduces the cost.

Figure 3:
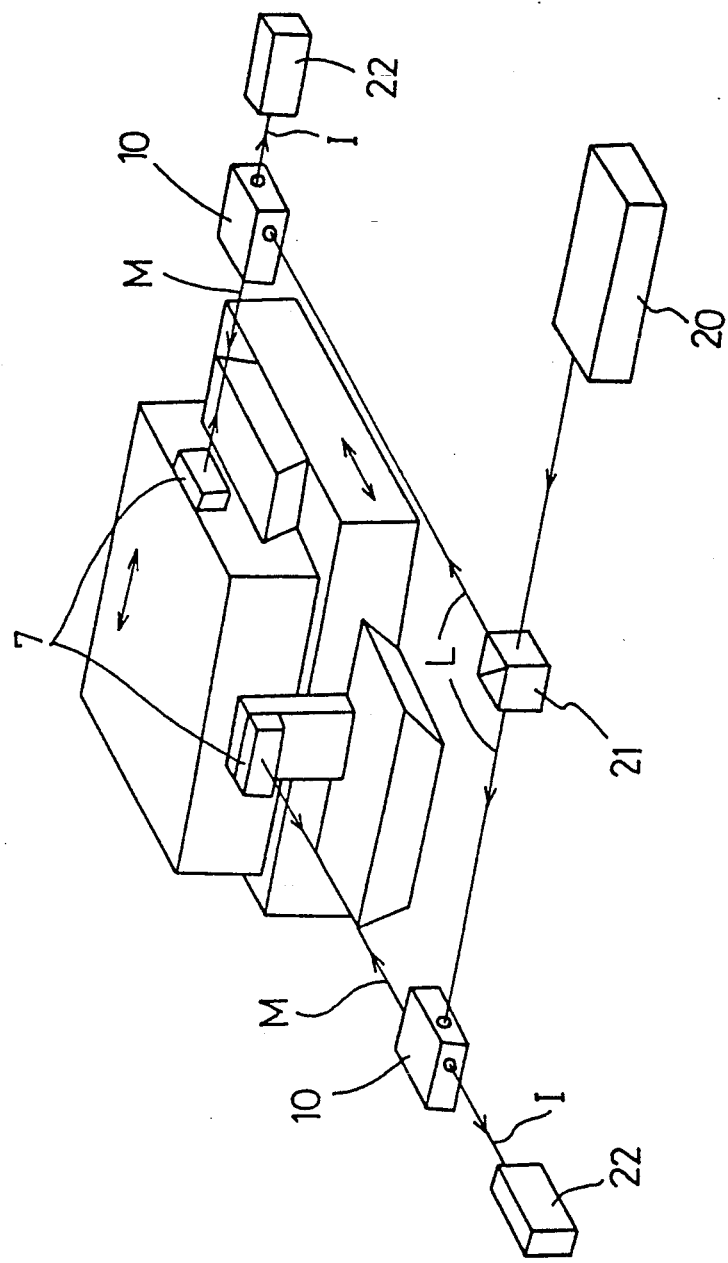
FIG. 3 is a general perspective view showing an example of a length measuring instrument for position detection of an X-Y two-axes table using an interference prism of the present invention.

Further, in the laser interference length measuring instrument, the corner cube prism 14 by which reference light flux R and measuring light flux L are returned into the interference prism 10, is positioned in an almost central portion of the length measuring instrument. When alignment of the optical system is adjusted by making a vertex of the corner cube prism a fulcrum, tilting of the length measuring instrument hardly influences on the length measurement, and therefore there is an advantage in that alignment of the optical system can be very easily conducted. Further, as described above, since the same effects can be obtained from the method in which laser light flux L enters the outward facing surface 19a of the triangle prism 19 and the optical path difference information light flux I is sent from the outward facing surface 18a, the direction of laser light flux L can be arranged in the same direction as that of measuring light flux M, or in two directions which make a right angle with each other. FIG. 3 shows the following: when the interference prism 10 is used in a manner in which laser light flux L makes a right angle with measuring light flux M, the structure of a length measuring instrument for position detection of an X-Y table which is moved in the direction of two axes, becomes more simple because two reflection mirrors 5 are not necessary, compared with the conventional length measuring instrument in FIGS. 4 and 5 or the length measuring instrument for position detection of an X-Y table in FIG. 6 in which the interference prism 10 of the present invention is used so that laser light flux L and length measuring light flux M have the same direction.

Figure 6:
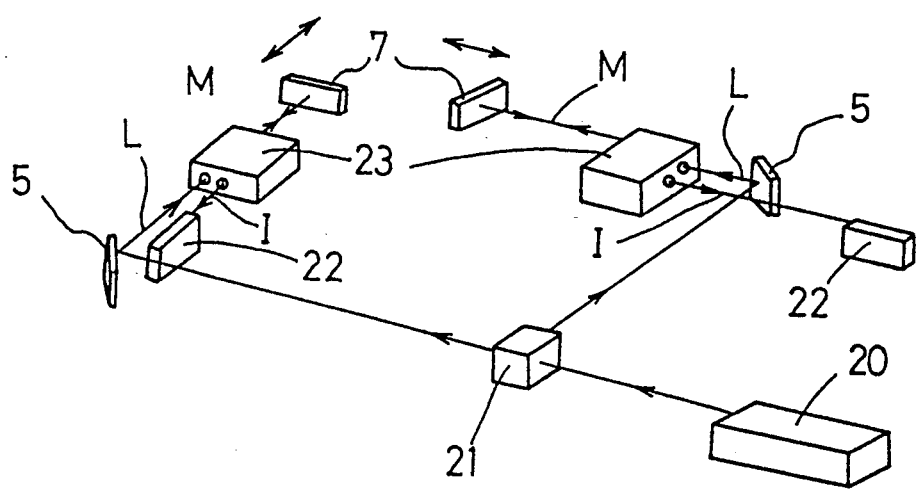
FIG. 6 is a perspective view of a main portion of a length measuring instrument for position detection of a X-Y two-axes table using a conventional deferential type laser interference length measuring instrument.

In FIGS. 3 and 6, the same symbols as those in FIGS. 1 and 2, or FIGS. 4 and 5, denote the same functioning members or functioning portions, and numeral 20 is a laser light source, 21 is a beam splitter, 22 is a position detection head, and 23 is a group of light elements located on the left side of the reference mirror 6 in FIG. 4 or FIG. 5. In FIGS. 3 and 6, the reference mirror provided on a stand is omitted.

Reflection in the parallelogram prism 18 becomes total reflection when its reflection surface is not coated, and intensity loss before or after the reflection becomes zero. However, in total reflection, fluctuation of phase in the P component and S component with regard to its incident surface is generated and retardation is generated, and therefore, polarized light conditions are changed before or after the reflection. This means that polarized light conditions of reference light flux R and length measuring light flux L which cross at right angles to make their interference minimum, are broken, resulting in the main factor by which S/N ratio of the detection signal is greatly lowered. For that reason, when the reflection surface is coated by a metallic coat such as Ag or Al, the retardation due to fluctuation of the phase can be made minimum, and thereby S/N ratio of the signal can be maintained at a high level to measure the length. However, when metallic coating is conducted, intensity attenuation is comparatively large, for example, the reflection ratio is around 95%. When dielectric coating is conducted on the reflection surface, retardation due to fluctuation of the phase can be lower than that in the case where coating is not conducted, and reduction of the reflection ratio can be lower than that in the case of metallic coating.

Since in the parallelogram prism 18, reference light flux R and length measuring light flux L are reflected once and they are coaxial, an intensity attenuation amount before or after reflection becomes the same. Consequently, gain at the time of detection of the optical path difference is maintained at the same level. This is a highly important and effective feature when the detection signal is made differential to remove a common mode noise. The same effect can be obtained when the same coating as that of the reflection surface of the parallelogram prism 18 is conducted on two total reflection surfaces except the coated surface 14b of the corner cube prism 14. Especially, in the corner cube prism 14, the number of reflections of reference light flux R and length measuring light flux M are respectively four times except that on the polarized beam splitting surface, and therefore it is important to prevent intensity attenuation before or after the reflection as much as possible. The light changing plate 12 may be a $\lambda/2$ phase shifting plate or a 90° rotatory polarization plate which has the same effect. In this case, if quartz is used for their material, when $\lambda$ is 436 nm, the thickness of the $\lambda/2$ phase shifting plate is about 2.2 mm and since the 90° rotatory polarization plate has a rotatory polarization angle of 41.5°/mm, its thickness becomes also about 2.2 mm, and therefore, they can be equally used in a dimension. However, in the λ/2 phase shifting plate, not only thickness but also its azimuth of an axis is required to be exactly set at a 45° azimuth. Therefore, in the range in which large thickness is not required, it is more advantageous in prism assembling work to use the 90° rotatory polarization plate.

When the angle $\theta$ made by the outward facing surface 18a of the parallelogram prism 18, into which the laser beam enters, and the connected surface is not 45°, and is set at $$\theta = 45° - \sin^{-1}(n.\sin(\cos^{-1}(1/\sqrt{3}) - 45°))$$

where the refractive index of the parallelogram prism 18 and the corner cube prism 14 is defined as n, the corner cube prism 14, in which the ordinary center axis is perpendicular to the transmission surface 14a, can be used, so that perpendicularity of the laser light flux L which enters the parallelogram prism 18, to reference light flux R or length measuring light flux M in the range between the corner cube prism 14 and the reference mirror 6 or measuring mirror 7, can be maintained. FIG. 2 shows the example described above, and an incident angle and emergent angle to and from the coated surface 14b of the corner cube prism 14 can be made 45° as shown in FIG. 1.

Furthermore, regarding optical path difference information light flux I, when a vertical angle $\alpha$ of the triangle prism 19 is not set at 90° and set at $$\alpha = 90° - \sin^{-1}(n.\sin(\cos^{-1}(1/\sqrt{3}) - 45°))$$

where the refractive index of the triangle prism 19 and the corner cube prism 14 is defined as n, its perpendicularity to laser light flux L can be maintained.

The merits in the example in FIG. 2 are as follows. Since the most extending corner cube prism in which the center axis is perpendicular to the transmission surface can be used for the corner cube prism 14 in the interference prism 10, it is advantageous in cost. Since the incident angle and emergent angle of laser light flux L and optical path difference information light flux I in the interference prism 10 to and from the interfacial surface of air is not zero, unnecessary reflection light does not become coaxial, so that S/N ratio of the detection signal can be improved. On the other hand, disadvantages of the example are as follows. Since refraction is positively used, the direction of polarized light of reference light flux R and length measuring light flux M is somewhat distorted. Furthermore, when light having a plurality of wavelengths, which will be described later, is used, it is difficult to use the light since it can not be coaxial.

In the example described above, laser light flux of one wavelength, or two wavelengths having a frequency difference of some MHz to some 10 MHz which is easily detected for beat frequency, is used as laser light flux L, and the interference prism 10 of the present invention is used so that accuracy of information of optical path difference information light flux I can be enhanced. However, noises due to the influence of disturbance factors are applied to the optical path difference information. Noises due to the influence of air fluctuation in the length measuring instrument have the largest ratio among noises. A laser interference length measuring method by which the influence of air fluctuation is removed is known as a second meeting material for nano-mechanism (16. 11. 1988) "the nanometer laser length measurement". That is the method by which only an equivalent amount of a variation of each measured value in an optical path length, which is different respectively due to dispersion of air, is counted as a geometrical change of distance by using laser light flux having a plurality of wavelengths.

When the above-described method is conducted by the length measuring instrument in FIG. 1, since light flux having a plurality of wavelengths is coaxial, reflection is performed identically, so that there is no problem. However, since retardation by the light changing plate 12 or a polarization light angle is dependant on the wavelength, this causes a problem. For example, when thickness of the light changing plate 12 is around 0.5 mm in a quartz plate, the wavelength λ in the λ/2 phase shifting plate is 400 nm, since the retardation is inversely proportional to a wavelength in the light having a wavelength of 720 nm, the retardation is only about 100°, not λ/2. When the thickness of the light changing plate 12 is made 4.5 mm, which is nine times that in the above case, the retardation is 9(λ/2)=(λ/2)+4λ, that is the same as λ/2, at λ=400 nm, and the retardation is 9×100×(λ/2)/180=(λ/2)+2λ, that is the same as λ/2, at λ=720 nm, That is, when the thickness of the light changing plate 12 of the interference prism 10 in FIG. 1 is made equivalent to that of the phase shifting plate such as $\lambda_1/2$, $\lambda_2/2$, in which $\lambda_1$, $\lambda_2$ are a plurality of wavelengths, the interference prism 10 of the present invention can be applied to the length measuring method by which the influence of air fluctuation can be removed. In this case, it should be noted that the λ/4 phase shifting plate 3 used on the outside of the transmission surface 14a of the corner cube prism 14 should be made to be a $\lambda_1/4$, or $\lambda_2/4$ phase shifting plate, the same as the light changing plate 12. The $\lambda_1/2$, or $\lambda_2/2$ phase shifting plate can be obtained by making the phase shifting plate as follows: when $\lambda_1 < \lambda_2$, one thickness of the $\lambda_1/2$ phase shifting plate (preferably, the minimum thickness) is defined as d, the phase shifting plate has the thickness of (2 n+1)d which satisfies (2 n+1)=(2 m+1)$\lambda_2/\lambda_1$ (where n, m are zero or the positive integer, n>m). In the above-described example of $\lambda_1$ 400 nm, or $\lambda_2$ 720 nm, n=4, m=2. The $\lambda_1/4$, or $\lambda_2/4$ phase shifting plate can be obtained by the method in which the thickness of the $\lambda_1/4$ phase shifting plate (preferably the minimum thickness) is multiplied by (4 n+1), (where (4 n+1)=(4 m+1)$\lambda_2/\lambda_1$). In the above-described example of $\lambda_1$ 400 nm, $\lambda_2$ 720 nm, and the minimum thickness of 0.25 mm of the $\lambda_1/4$ phase shifting plate, the thickness can be obtained by satisfying the condition in which n=2, m=1, that is, 9×0.25=2.25 mm (half the thickness of 4.5 mm of the light changing plate 12).

When the 90° rotatory polarization plate is used for the light changing plate, the rotatory polarization plate having the thickness of (2 n +1)d can be obtained, which satisfies the condition: (2 n+1)=(2 m+1)π/2φ, (where n and m are zero or positive integer, n>m), when a rotatory polarization angle of $\lambda_2$ becomes φ at the thickness d in which a rotatory polarization angle of $\lambda_1$ becomes π/2. The interference prism 10 in which the rotatory polarization plate is used, can be applied to the length measuring method, by which influence due to air fluctuation can be removed, in the same manner as the above example. In the rotatory polarization plate, since λ-dependence of the rotatory polarization angle is proportional to $\lambda^{-2}$, which is different from the case of the phase shifting plate, the difference between n and m becomes large in general when the light changing plate 12 is made to match a plurality of wavelengths, $\lambda_1$ and $\lambda_2$, and then its thickness is apt to be larger than the phase shifting plate.

As described above, when the interference prism 10 which is matched with a plurality of wavelengths is used, high optical stability in the interference prism 10 can be maintained, and accurate length measurement in which the influence due to air fluctuation is corrected can be conducted without providing an additional optical element.

What is claimed is:

1. A laser interferometer for measuring the position of an object, comprising:

a beam generator to emit a laser beam;

an optical unit having an incident surface to receive the laser beam form the beam generatory, a split surface at which the laser beam is split into a measuring beam and a reference beam in accordance with the polarization condition thereof, a transmitting surface through which the measuring beam is emitted to a movable mirror and is reflected back to the optical unit and the reference beam is emitted to a fixed mirror and is reflected back to the optical unit, wherein the reflected measuring beam and the reflected reference beam are combined at the split surface so as to form a output beam carrying measurement information of optical path length difference between the reflected measuring beam and the reflected reference beam, and an exit surface through which the output beam is outputted to a measuring device;

the movable mirror located at the position of the object;

the fixed mirror located at a predetermined position;

the measuring device to analyze the output beam and to determine the position of the object;

the optical unit including a corner cube prism having a coated surface to selectively reflect or pass a beam therethrough in accordance with the polarization condition of the beam, a reflection surface to completely reflect a beam and a base surface, wherein the coated surface and the reflection surface form the apex of the corner cube prism and the corner cube is arranged so that the coated surface is used as the split surface, the base surface is used as the transmission surface and the reflection surface relays the measuring beam and the reference beam between the split surface and the transmission surface, a parallelogram prism attached tot he coated surface of the corner cube prism, a triangle prism attached to the coated surface of the corner cube prism, the triangle prism positioned next to the parallelogram prism on the apex side of the corner cube prism, and a polarizing plate sandwiched between the parallelogram prism and the triangle prism, wherein the corner cube prism, the parallelogram prism, the triangle prism and the polarizing plate are integrated to form one body, and wherein when the parallelogram prism is used to form the incident surface, the triangle prism is used to form the exit surface, alternatively, when the triangle prism is sued to form the incident surface, the parallelogram prism is sued to form the exit surface.

2. The laser interferometer of claim 1, wherein each one of the coated surface and the reflection surface is arranged to face both the movable mirror and the fixed mirror so that each one of the coated surface and the reflection surface receives both the measuring beam form the movable mirror and the reference beam from the reference beam without the measuring beam and the reference beam being reflected on an intermediate surface on the way between each one of the coated surface and a reflection surface and each one of the movable mirror and the fixed mirror.

3. The apparatus of claim 1 wherein the triangle prism is positioned on the apex side of the coated surface of the corner cube prism.

4. The apparatus of claim 1, wherein a surface of the parallelogram prism parallel to the coated surface of the corner cube prism includes a reflection coating.

5. The apparatus of claim 4, wherein the reflection coating is a metallic coating.

6. The apparatus of claim 4, wherein the reflection coating is made of a dielectric coating.

7. The apparatus of claim 1, wherein an acute angle of the parallelogram prism is 45°.

8. The apparatus of claim 1, wherein a vertically opposite angle of a conjunction surface of the triangle prism fixed to the polarized beam split surface of the corner cube prism is 90°.

9. The apparatus of claim 1, further including a $\lambda/4$ phase shift plate adjacent the transmission surface.

10. The apparatus of claim 9, wherein the $\lambda/4$ phase shift plate is a $\lambda$ i/4 phase shift plate for a plurality of wavelengths $\lambda$ i (i=1, 2, $\cdots$).

11. The apparatus of claim 1, wherein said polarizing plate is a $\pi°$ optical rotating plate.

12. The apparatus of claim 11, wherein the 90° optical rotating plate is a 90° optical rotating plate for a plurality of wavelengths $\lambda$ i (i=1,2, $\cdots$).

* * * * *

UNITED STATES PATENT AND TRADEMARK OFFICE
CERTIFICATE OF CORRECTION

PATENT NO. : 5,305,089
DATED : April 19, 1994
INVENTOR(S) : Shigeru Hosoe

It is certified that error appears in the above-indentified patent and that said Letters Patent is hereby corrected as shown below:

Title page, item [57],
Abstract, col. 1, line 1, change "interterometric" to --interferometric--.

line 3, change "a" to --an--. (2nd occurrence)
                line 5, change "let the beams to" to --lets the beams--.

Claim 1, column 9, line 18, change "form the beam generatory" to --from the beam generator--.
        column 10, line 1, change "tot he" to --to the--.
        column 10, line 15, change "sued" to --used--.
        column 10, line 16, change "sued" to --used--.

Claim 2, column 10, line 23, change "form" to --form--.

Claim 10, column 10, line 50, change "(i=1,2---) to --(i=1,2,--).

Claim 11, column 10, line 50, change " $\pi°$ " to --90°--.

UNITED STATES PATENT AND TRADEMARK OFFICE
CERTIFICATE OF CORRECTION

PATENT NO. : 5,305,089
DATED : April 19, 1994
INVENTOR(S) : Shigeru Hosoe

It is certified that error appears in the above-indentified patent and that said Letters Patent is hereby corrected as shown below:

Claim 12, column 10, next to the last line, change "(i=1,2,---)" to --(i=1,2,--)--.

Signed and Sealed this

Third Day of January, 1995

Attest:

BRUCE LEHMAN

Attesting Officer     Commissioner of Patents and Trademarks